(12) United States Patent
Eng et al.

(10) Patent No.: US 9,009,168 B2
(45) Date of Patent: *Apr. 14, 2015

(54) TECHNIQUE FOR INCREASING THE NUMBER OF PERSISTENT CONSISTENCY POINT IMAGES IN A FILE SYSTEM

(75) Inventors: Emily Eng, San Francisco, CA (US); Andy C. Kahn, San Francisco, CA (US); John K. Edwards, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/401,469

(22) Filed: Feb. 21, 2012

(65) Prior Publication Data

US 2012/0150807 A1 Jun. 14, 2012

Related U.S. Application Data

(63) Continuation of application No. 11/333,145, filed on Jan. 17, 2006, now Pat. No. 8,122,286, which is a continuation of application No. 10/777,979, filed on Feb. 12, 2004, now Pat. No. 7,313,720.

(51) Int. Cl.
*G06F 7/00* (2006.01)
*G06F 17/30* (2006.01)

(52) U.S. Cl.
CPC ... *G06F 17/30067* (2013.01); *Y10S 707/99953* (2013.01)

(58) Field of Classification Search
None
See application file for complete search history.

(56) References Cited

U.S. PATENT DOCUMENTS

| | | | |
|---|---|---|---|
| 4,570,217 | A | 2/1986 | Allen et al. |
| 4,814,971 | A | 3/1989 | Thatte |
| 5,043,871 | A | 8/1991 | Nishigaki et al. |
| 5,043,876 | A | 8/1991 | Terry |
| 5,088,026 | A | 2/1992 | Bozman et al. |
| 5,129,085 | A | 7/1992 | Yamasaki |

(Continued)

FOREIGN PATENT DOCUMENTS

| | | |
|---|---|---|
| EP | 0 359 384 A2 | 3/1990 |
| EP | 0 359 384 A3 | 7/1991 |

(Continued)

OTHER PUBLICATIONS

"Action Closing Prosecution", United States Patent and Trademark Office, Reexamination Control No. 95/000,373 of Patent No. 7,313,720, mailed Sep. 28, 2010, 43 pages.

(Continued)

*Primary Examiner* — Michael Hicks
(74) *Attorney, Agent, or Firm* — Casari and McKenna LLP

(57) ABSTRACT

An on-disk storage arrangement increases the number of persistent consistency point images (PCPIs) that may be maintained for a volume of a storage system. The on-disk storage arrangement comprises a novel volume information (volinfo) block representing a root of the volume; the volinfo block is stored at predefined locations on disk and comprises various system wide configuration data. The volinfo block further comprises a data structure configured to provide a level of indirection that increases the number of PCPIs maintainable by a file system executing on the storage system. To that end, the data structure may be organized as an array of pointers, wherein each pointer references a block containing a snapshot root, thereby enabling efficient access to each PCPI maintained by the file system.

20 Claims, 7 Drawing Sheets

(56) References Cited

U.S. PATENT DOCUMENTS

| | | | |
|---|---|---|---|
| 5,155,835 A | 10/1992 | Belsan | |
| 5,163,131 A | 11/1992 | Row et al. | |
| 5,182,805 A | 1/1993 | Campbell | |
| 5,201,044 A | 4/1993 | Frey et al. | |
| 5,202,979 A | 4/1993 | Hillis et al. | |
| 5,210,866 A | 5/1993 | Milligan et al. | |
| 5,218,695 A | 6/1993 | Noveck et al. | |
| 5,278,979 A | 1/1994 | Foster et al. | |
| 5,287,496 A | 2/1994 | Chen et al. | |
| 5,313,646 A | 5/1994 | Hendricks et al. | |
| 5,369,757 A | 11/1994 | Spiro et al. | |
| 5,379,391 A | 1/1995 | Belsan et al. | |
| 5,403,639 A | 4/1995 | Belsan et al. | |
| 5,410,667 A | 4/1995 | Belsan et al. | |
| 5,455,946 A | 10/1995 | Mohan et al. | |
| 5,457,796 A * | 10/1995 | Thompson | 1/1 |
| 5,481,699 A | 1/1996 | Saether | |
| 5,504,857 A | 4/1996 | Baird et al. | |
| 5,819,292 A | 10/1998 | Hitz et al. | |
| 5,963,962 A | 10/1999 | Hitz et al. | |
| 6,289,356 B1 | 9/2001 | Hitz et al. | |
| 6,311,193 B1 | 10/2001 | Sekido | |
| 6,484,186 B1 | 11/2002 | Rungta | |
| 6,636,879 B1 | 10/2003 | Doucette et al. | |
| 6,708,227 B1 | 3/2004 | Cabrera et al. | |
| 6,721,764 B2 | 4/2004 | Hitz et al. | |
| 6,728,922 B1 | 4/2004 | Sundaram et al. | |
| 6,959,313 B2 | 10/2005 | Kapoor et al. | |
| 7,072,916 B1 | 7/2006 | Lewis et al. | |
| 7,313,720 B1 | 12/2007 | Eng et al. | |
| 7,769,723 B2 * | 8/2010 | Zheng et al. | 707/682 |
| 2002/0083037 A1 | 6/2002 | Lewis et al. | |
| 2002/0083072 A1 | 6/2002 | Steuart | |
| 2003/0182317 A1 * | 9/2003 | Kahn et al. | 707/200 |
| 2004/0139273 A1 | 7/2004 | Doucette et al. | |
| 2004/0260673 A1 | 12/2004 | Hitz et al. | |

FOREIGN PATENT DOCUMENTS

| | | | |
|---|---|---|---|
| EP | 0 453 193 A2 | 10/1991 | |
| EP | 0702815 B1 * | 3/1996 | G06F 11/14 |
| EP | 94 92 1242.7 | 6/1998 | |

OTHER PUBLICATIONS

Agrawal, Rakesh and Dewitt, David J., "Integrated Concurrency Control and Recovery Mechanisms: Design and Performance Evaluation,", ACM Transactions on Database Systems, col. 10, No. 4, Dec. 1985, 36 pages.

Akyurek, Sedat, Placing Replicated Data to Reduce Seek Delays, Department of Computer Science, University of Maryland, UMIACS-TR-91-121, CS-TR-2746, Aug. 1991.

Answer and Counterclaims to First Amended Complaint for: (1) Patent Infringement, (2) Unfair Competition Under the Lanham Act, (3) Unfair Competition Under Cal. Bus. & Prof. Code § 17200, filed Dec. 21, 2007 in United States District Court for the Northern District of Califronia, San Francisco Division. Case No. 5:07-cv-05488-JW, 29 pages.

Bach, Maurice J., "The Design of the UNIX Operating System," Chapter 4: Internal Representation of Files, Prentice Hall, 1990, 31 pages.

Bach, Maurice J., "The Design of the UNIX Operating System," Chapter 5: System Calls for the File System, Prentice Hall, 1990, pp. 91-145.

Baker, Mary, et al., "Non-Volatile Memory for Fast, Reliable File Systems," ACM, 1992, 13 pages.

Bitton, Dina, et al., "Disk Shadowing", Proceedings of the 14th VLDB Conference, Los Angeles, California 1988 pp. 331-338.

Borg, Anita, et al., "Fault Tolerance Under UNIX," ACM Transactions on Computer Systems, vol. 7, No. 1, Feb. 1989, 24 pages.

Chaudhuri, Surajit, et al., Self-Tuning Technology in Microsoft SQL Server, Data Engineering Journal 22, 2 1999 pp. 20-27.

Chen, Peter M., et al., "An Evaluation of Redundant Arrays of Disks Using an Amdahl 5890", Computer Science Division, University of California, Berkeley, 1989.

Chutani, Sailesh, et al., The Episode File System, in Proceedings of the USENIX Winter 1992.

"Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Oct. 29, 2007 in United States District Court for the Northern District of Californina, San Jose Division, Civil Action No. 5:07-cv-05448-JW, 15 pages.

Cox, Russ, "Fossil: an archival file server", Online Presentation (http://swtch.co~rsc/talks/group03-fossil.pdf), PDOS Group Meeting; Jan. 7, 2003, 26 pages.

Coyne, Robert A., et al., Storage Systems for National Information Assets, Proc. Supercomputing 92, Minneapolis, Nov. 1992, pp. 626-633.

"Declaration of Dr. John H. Hartman in Support of Sun Microsystems, Inc.'s Reply Claim Construction Brief", filed Oct. 10, 2008 in United States District Court for the Northern District of california, San Francisco Division, Case No. 3:07-cv-05488-EDL, 3 pages.

"Declaration of Dr. Scott Brandt in Support of Sun Microsystems, Inc.'s Reply Claim Construction Brief Concerning the NetApp Patent Claim Terms (with Exhibit 1)", filed Oct. 10, 2008 in United States District Court for the Northern District of California, San Francisco Division, Case No. 3:07-cv-05488-EDL, 34 pages.

"Declaration of Dr. Scott Brandt in Support of Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 7 pages.

"Declaration of Dr. John Hartman in Support of Sun Microsystems, Inc.'s Opening Claim Construction Brief (with Exhibits 1-4)", filed Sep. 15, 2008 in United States District Court for the Northern District of California, San Jose Division, Civil Action No. 5:07-cv-05448-JW, 34 pages.

"Declaration of Dr. Martin E. Kaliski in Support of Sun Microsystems, Inc.'s Responsive Claim Construction Brief" (with Exhibits A-D), filed Sep. 29, 2008 in United States District Court for the Northern District of California, San Francisco Division, Case No. 3:07-cv-05488-EDL, 34 pages.

"Declaration of Dr. A.L. Narashima Reddy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv-05488-EDL, 18 pages.

"Declaration of Dr. John Levy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv-05488-EDL, 20 pages.

Dion, "The Cambridge File Server," ACM SIGOPS Oper. Syst. Rev. 14, 4, 1980, pp. 26-35.

Finlayson, Ross S., et al., Log Files: An Extended File Service Exploiting Write-Once Storage Department of Computer Science, Stanford University, Report No. STAN-CS-87-1177, Sep. 1987.

"First Amended Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Nov. 2, 2007 in United States District Court for the Northern District of California, San Jose Division, Civil Action No. 5:07-cv-05448-JW, 15 pages.

"FreeBSD 5.0", available for public download at ftp://ftp.freebsd.org/pub/FreeBSD/releases/i386/7.0-RELEASE/src/, Jan. 2003, 24 pages.

Fridrich, et al., "The Felix File Server," ACM 0-89791-062-1-12/81-0037, 1981, pp. 37-44.

Gait, Jason, "The Optical File Cabinet: A Random-Access File System for Write-Once Optical Disks", IEEE Computer, Jun. 1988, pp. 11-22.

(56) References Cited

OTHER PUBLICATIONS

Gait, Jason. "The Optical File Cabinet: A Random Access File System for Write-Once Optical Disks", published by Tektronix, Jun. 1988, 12 pages.
Gait, Jason, "Pheonix: A Safe In-Memory File System", Communications of the ACM, vol. 33, No. 1, Jan. 1990, pp. 81-86.
Gait,"A Checkpointing Page Store for Write-Once Optical Disk, " IEEE Transactions on Computers, vol. 39, No. 1, Jan. 1990, pp. 2-9.
Gray, Jim, et al., "The Recovery Manager of the System R Database Manager," ACM Computing Surveys, vol. 13, No. 2, Jun. 1981, 20 pages.
Hagmann, Robert, "Reimplementing the Cedar File System Using Logging and Group Commit," ACM, 1987, 8 pages.
Hecht, Matthew S. and Gabbe, John D., "Shadowed Management of Free Disk Pages with a Linked List," ACM Transactions on Database Systems, vol. 8, No. 4, Dec. 1983, Dec. 1983, 12 pages.
Hitz, David., et al., "File System Design for an NFS File Server Appliance", Technical Report 3002, Rev. C3/95, Network Appliance, USENIX Winter 1994.
Howard, John, H. et al., Scale and Performance in a Distributed File System, Carnegie Mellon University, CMU-ITC-87-068, Aug. 1987.
Howard, John H., An Overview of the Andrew File System, Carnegie Mellon University, CMU-ITC-88-062 1988.
Howard, John, H. et al., Scale and Performance in a Distributed File System, ACM Trans. Computer System, 6(1), Feb. 1988 pp. 51-81.
Kazar, Michael Leon, Synchronization and Caching Issues in the Andrew File System, Carnegie Mellon University, CMU-ITC-88-063.
Kazar, Michael L., et al., DEcorum File System Architectural Overview, USENIX Summer Conference, Anaheim, California, 1990.
Kemper, Alfons, et al., Performance Tuning for SAP R/3, Data Engineering Journal 22, 2 1999 pp. 33-40.
Kent, Jack et al., Optimizing Shadow Recovery Algorithms, IEEE Transactions on Software Engineering, 14( 2): 155-168 , Feb. 1988.
Kent, Jack Marshall, "Performance and Implementation Issues in Database Crash Recovery," Princeton University Dissertation, Oct. 1985, 210 pages.
Kistler, et al., Disconnected Operation in the Coda File System, ACM Transactions on Computer Systems, vol. 10, No. 1, Feb. 1992, pp. 3-25.
Landau, Charles R., "The Checkpoint Mechanism in KeyKOS," IEEE, 1992, 6 pages.
Lampson, Butler W. and Sturgis, Howard E., "Crash Recovery in a Distributed Data Storage System," Jun. 1979, 28 pages.
Leffler, Samuel J., et al., "The Design and Implementation of the 4.3BSD UNIX Operating System," Chapter 7: The File System, Addison-Wesley Publishing Company, Inc., 1989, 37 pages.
Lorie, Raymond A., "Physical Integrity in a Large Segmented Database," ACM Transactions on Database Systems, vol. 2, No. 1, Mar. 1977, 14 pages.
McKusick, Marshall Kirk. "Running 'Fsck' in the Background", published by USENIX Assocation: Proceedings of the BSDCon Conference, San Francisco, California, Feb. 11-14, 2002, 11 pages.
Murphy, Daniel L., "Storage Organization and Management in TENEX," Fall Joint Computer Conference, 1972, 12 pages.
NetApp's Patent L.R. 3-1 Disclosure of Asserted Claims and Preliminary Infringement Contentions for U.S. Patent No. 7,313,720, filed Apr. 10, 2008 in United States District Court for the Northern District of California, San Francisco Division, Case No. C-07-05488-EDL, 8 pages.
NetApp Inc.'s Patent Local Rule 3-6 Disclosure for U.S. Patent No. 7,313,720, filed Jan. 27, 2009 in United States District Court for the Northern District of California, San Francisco Division, Case No. C-07-05488-EDL, 8 pages.
"NetApp Inc.'s Reply to Sun Microsystems, Inc.'s Responsive Claim Construction Brief", filed Oct. 10, 2008 in United States District Court for the Northern District of California, San Francisco Division, Case No. 3:07-cv-05488-EDL, 19 pages.
Network Appliance, Inc. v. Sun Microsystems, Inc., "Defendant-Counterclaim Plaintiff Sun Microsystems, Inc.'s Preliminary Invalidity Contentions and Accompanying Document Production for U.S. Patent No. 6,892,211 [Patent L.R. 3-3 and 3-4]," filed Mar. 6, 2008 in the United States District Court Northern District of California San Francisco Division, Case No. 3:07-CV-06053-EDL, 173 pages.
Network Appliance, Inc. v. Sun Microsystems, Inc., "Complaint for Patent Infringement and Demand for Jury Trial", filed Sep. 5, 2007 in United States District Court for the Eastern District of Texas, Lufkin Division. Civil Action No. 9:07CV206, 18 pages.
Network Appliance, Inc. v. Sun Microsystems, Inc., v. Network Appliance, Inc., "Defendant Sun Microsystems, Inc.'s Answer and Counterclaim to Plaintiff Network Appliance, Inc.'s Complaint for Patent Infringement", filed Oct. 25, 2007 in United States District Court for the Eastern District of Texas, Lufkin Division. Civil Action No. 9:07CV206, 64 pages.
Network Appliance, Inc. v. Sun Microsystems, Inc., "Network Appliance's Reply to Sun's Answer and Counterclaims", filed Dec. 7, 2007 in United States District Court for the Northern District of California, San Francisco Division. Case No. 3:07-CV-06053-EDL, 39 pages.
Network Appliance, Inc. v. Sun Microsystems, Inc., "Sun Microsystems Inc.'s Opening Claim Construction Brief", filed on Jul. 7, 2008, in United States District Court for the Northern District of California, San Francisco Division. Case No. 3:07-CV-06053-EDL, 43 pages.
Network Appliance, Inc. v. Sun Microsystems, Inc., "Plaintiff NetApp Inc.'s Response to Sun's Opening Claim Construction Brief", filed on Jul. 21, 2008, in United States District Court for the Northern District of California, San Francisco Division. Case No. 3:07-CV-06053-EDL, 47 pages.
Network Appliance, Inc. v. Sun Microsystems, Inc., "Sun Microsystems Inc.'s Reply Claim Construction Brief", filed on Aug. 1, 2008, in United States District Court for the Northern District of California, San Francisco Division. Case No. 3:07-CV-06053-EDL, 41 pages.
Network Appliance, Inc. v. Sun Microsystems, Inc., "Order Construing Claims", Ordered on Sep. 10, 2008, in United States District Court for the Northern District of California, San Francisco Division. Case No. C-07-06053-EDL, 60 pages.
Network Appliance, Inc. v. Sun Microsystems, Inc., "Further Order Construing Claims", Ordered on Sep. 29, 2008, in United States District Court for the Northern District of California, San Francisco Division. Case No. C-07-06053-EDL, 2 pages.
Network Appliance, Inc. v. Sun Microsystems, Inc., "Joint Report Re: Claim Construction of Incore Root Inode", Nov. 5, 2008, in United States District Court for the Northern District of California, San Francisco Division. Case No. 3:07-CV-06053-EDL, 2 pages.
Network Appliance, Inc. v. Sun Microsystems, Inc., "Sun Microsystems, Inc.'s Local Rule 3-6 Invalidity Contentions for U.S. Patent No. 5,819,292", dated Nov. 19, 2008 in United States District Court for the Northern District of California, San Francisco Division. Case No. 3:07-CV-06053-EDL, 72 pages including Exhibits.
Network Appliance, Inc. v. Sun Microsystems, Inc., "Sun Microsystems, Inc.'s Local Rule 3-6 Invalidity Contentions for U.S. Patent No. 6,892,211", dated Nov. 10, 2008 in United States District Court for the Northern District of California, San Francisco Division. Case No. 3:07-CV-06053-EDL, 108 pages including Exhibits.
Network Appliance, Inc. v. Sun Microsystems, Inc., "Defendant Sun Microsystems, Inc.'s Amended Answer and Counterclaim to Plaintiff Network Appliance, Inc.'s Complaint for Patent Infringement", dated Oct. 25, 2007 in United States District Court of the Eastern District of Texas, Lufkin Division. Civil Action No. 9:07-CV-206-RHC, 64 pages.
Network Appliance, Inc. v. Sun Microsystems, Inc., "Expert Report of Dr. Marshall Kirk McKusick Regarding Invalidity of U.S. Patent No. 7,313,720", filed Oct. 12, 2009 in United States District Court for the Northern District of California, San Francisco Division, Case No. 3:07-CV-05488-EDL, 107 pages.
Network Appliance, Inc. v. Sun Microsystems, Inc., "Network Appliance's Patent Local Rule 3-1 Disclosure of Asserted Claims and Preliminary Infringement Contentions for U.S. Patent No. 6,892,211," filed Jan. 22, 2008 in the United States District Court Northern District of California San Francisco Division, Case No. 3:07-CV-06053-EDL, 8 pages.

(56) References Cited

OTHER PUBLICATIONS

*Network Appliance, Inc.* v. *Sun Microsystems, Inc.*, "Network Appliance's Patent Local Rule 3-1 Disclosure of Asserted Claims and Preliminary Infringement Contentions for U.S. Patent No. 5,819,292," filed Jan. 22, 2008 in the United States District Court Northern District of California San Francisco Division, Case No. 3:07-CV-06053-EDL, 6 pages.
*Network Appliance, Inc.* v. *Sun Microsystems, Inc.*, "Defendant-Counterclaim Plaintiff Sun Microsystems, Inc.'s Preliminary Invalidity Contentions and Accompanying Document Production for U.S. Patent No. 5,819,292 [Patent L.R. 3-3 and 3-4]," filed Mar. 6, 2008 in the United States District Court Northern District of California San Francisco Division, Case No. 3:07-CV-06053-EDL, 40 pages.
"Office Action in Inter Partes Reexamination", issued by the United States Patent and Trademark Office, Reexamination Control No. 95/000,373 of Patent No. 7,313,720, mailed Dec. 19, 2008, 13 pages.
"Notice RE Defective Paper in Inter Partes Reexamination", issued by the United States Patent and Trademark Office, Reexamination Control No. 95/000,373 of Patent No. 7,313,720, mailed Sep. 24, 2009, 5 pages.
"Office Action in Inter Partes Reexamination", issued by the United States Patent and Trademark Office, Reexamination Control No. 95/000,373 of Patent No. 7,313,720, mailed Dec. 22, 2009, 12 pages.
"Order Construing Claim Terms of the '720 and '417 Patents", filed Dec. 23, 2008 in United States District Court for the Northern District of California, San Francisco Division, Case No. 3:07-cv-05488-EDL, 38 pages.
"Order Regarding Tentative Claim Construction", filed Jan. 14, 2009 in United States District Court for the Northern District of California, San Francisco Division, Case No. 3:07-cv-05488-EDL, 2 pages.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.
Patterson, D., et al., A Case for Redundant Arrays of Inexpensive Disks (RAID), Technical Report, CSD-87-391, Computer Science Division, Electrical Engineering and Computer Sciences, University of California at Berkeley 1987.
Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 Sep. 1988.
David A. Patterson et al., "A Case for Redundant Arrays of Inexpensive Disks (RAID)" Computer Science Division, University of California, 1998.
Peterson, Zachary Nathaniel Joseph, Data Placement for Copy-on-Write Using Virtual Contiguity, University of CA, Santa Cruz, Master's Thesis for the Department of Science in Computer Science, Sep. 2002.
Brian Pawlowski et al., "Multi-Protocol Storage Appliance That Provides Integrated Support for Flle and Block Access Protocols", U.S. Appl. No. 10/215,917, filed Aug. 9, 2002.
Popek, Gerald J. and Walker, Bruce J., "The LOCUS Distributed System Architecture," Chapter 3, 1985, Cataloged May 1986, The MIT Press, Cambridge, MA, 48 pages.
Quinlan, Sean, et al. "Fossil, an Archival File Server" (http://www.cs.bell-labs.com/sys/doc/fossil.pdf), Alcatel-Lucent, 8 pages.
Quinlan, Sean, "A Cached WORM File System," Software—Practice and Experience, vol. 21, No. 12, Dec. 1991, 11 pages.
"Response", United States Patent and Trademark Office, Reexamination Control No. 95/000,373 of Patent No. 7,313,720, filed Feb. 19, 2009, 24 pages.
"Response", United States Patent and Trademark Office, Reexamination Control No. 95/000,373 of Patent No. 7,313,720, filed Feb. 22, 2010, 80 pages.
Rosenblum, Mendel and Ousterhout, John K., "The LFS Storage Manager," USENIX Technical Conference, Anaheim, CA, Jun. 1990, 16 pages (SUN00006851-SUN00006866).
Rosenblum, Mendel, et al., The LFS Storage Manager, Computer Science Division, Electrical Engineering and Computer Sciences, Univ. of CA, presented at Summer '90 USENIX Technical Conference, Anahaeim, CA June 1990.
Rosenblum, Mendel and Ousterhout, John K., "The Design and Implementation of a Log-Structured File System," Jul. 1991, 15 pages. (SUN00006867-SUN00006881).
Rosenblum, Mendel and Ousterhout, John K., "The Design and Implementation of a Log-Structured File System," Jul. 1991, 15 pages. (SUN00007382-SUN00007396).
Rosenblum, Mendel, "The Design and Implementation of a Log-Structured File System," UC Berkeley, 1992, 100 pages.
Rosenblum, Mendel, The Design and Implementation of a Log-Structured File System, 1992 pp. 1-93.
Rosenblum, Mendel and Ousterhout, John K., "The LFS Storage Manager," USENIX Technical Conference, Anaheim, CA, Jun. 1990, 16 pages.
Rosenblum, Mendel, et al., The Design and Implementation of a Log-Structured File System, in Proceedings of ACM Transactions on Computer Systems, (10)1:26-52, Feb. 1992.
Rosenblum, Mendel and Ousterhout, John K., "The Design and Implementation of a Log-Structured File System," Jul. 1991, 15 pages.
Salem, Kenneth and Garcia-Molina, Hector, "Checkpointing Memory—Resident Database," IEEE 1989, 11 pages.
Svobodova, "File Servers for Network-Based Distributed Systems," ACM Computing Surveys, vol. 16, No. 4, 1984, pp. 353-398.
Schiefer, Berni, et al., DB2 Universal Database Performance Tuning, Data Engineering Journal 22, 2 1999 pp. 12-19.
Schilling, Jorg, "Design and Implementation of a Fast File System for UNIX with Special Consideration of Technical Parameters of Optical Storage Media and Multimedia Applications," Technical University of Berlin Thesis, May 1991, 119 pages.
Schilling, Jorg, "Entwurf und Implementierung eines Schnellen Filesystems fur UNIX Unter Besonderer Berucksichtigung der Technischen Parameter Optischer Speichermedien und Multimedialer Anwendungen," Matrikel-Nr. 45181. 118 pages.
Seltzer, Margo Ilene, "File System Performance and Transaction Support,"University of California at Berkeley Dissertation, 1992, 131 pages.
Seltzer, Margo I., et al., Journaling Versus Soft Updates: Asynchronous Meta-Data Protection in File Systems, Proceedings of 200 USENIX Annual Technical Conference, Jun. 18-23, 2000.
Seltzer, Margo and Stonebraker, Michael, "Transaction Support in Read Optimized and Write Optimized File Systems," Proceedings of the 16th VLDB Conference, 1990, 12 pages.
Seltzer, Margo Ilene, "File System Performance and Transaction Support, "University of California at Berkeley Dissertation, 1992, 131 pages.
Seltzer, Margo, et al., "An Implementation of a Log-Structured File System for UNIX," 1993 Winter USENIX, Jan. 1993, San Diego, CA, 18 pages.
Shasha, Dennis, Tuning Time Series Queries in Finance: Case Studies and Recommendations, Data Engineering Journal 22, 2 1999 pp. 41-47.
Sidebotham, Bob, Volumes: The Andrew File System Data Structuring Primitive, EEUG Conference Proceedings, Manchester, UK, Autumn 1986.
Singhal, Vivek, et al., "Texas: An Efficient, Portable Persistent Store," Proceedings of the Fifth International Workshop on Persistent Object Systems, San Miniato, Pisa), Italy, Sep. 1992, 25 pages.
Srinivasan, B. and Gunasingham, H., Recoverable File System for Microprocessor Systems, vol. 9, No. 4, May 1985, Great Britain, XP 002031805, 5 pages.
"Stipulated Dismissal Without Prejudice and [Proposed] Order", filed Sep. 8, 2010 in United States District Court for the Northern District of California, San Francisco Division, Case No. 3:07-cv-05488-EDL, 2 pages.
Subramanian, Muralidhar, et al., Performance Challenges in Object-Relational DBMSs, Data Engineering Journal 22, 2 1999 pp. 28-32.
*Sun Microsystems, Inc.* v. *Network Appliance, Inc.*, "Supplemental Answer and Counterclaims to First Amended Complaint for: (1) Patent Infringement (2) Unfair Competition Under the Lanham Act

(56) References Cited

OTHER PUBLICATIONS (3) Unfair Competition under Cal. Bus. & Prof. Code § 17200", dated Feb. 19, 2008, in the United States District Court of the Northern District of California, San Francisco Division, Case No. C-07-05488 EDL, 28 pages.

*Sun Microsystems, Inc. v. Network Appliance, Inc.*, "Sun Microsystems, Inc.'s Reply to Network Appliance, Inc.'s Supplemental Answer and Counterclaims to First Amended Complaint and Counterclaims for Declaratory Relief", dated Mar. 7, 2008, in the United States District Court of the Northern District of California, San Francisco Division, Case No. C-07-05488 EDL, 19 pages.

*Sun Microsystems, Inc. v. Network Appliance, Inc.*, "NetApp's Patent Local Rule 4-2 Disclosure of Claim Constructions", dated Jun. 27, 2008, in the United States District Court of the Northern District of California, San Francisco Division, Case No. C-07-05488 EDL, 27 pages.

*Sun Microsystems, Inc. v. Network Appliance, Inc.*, "Sun Microsystems Inc.'s Patent Local Rule 4-2 Disclosure of Preliminary Claim Construction and Extrinsic Evidence", dated Jun. 27, 2007, in the United States District Court of the Northern District of California, San Francisco Division, Case No. C-07-05488 EDL, 38 pages.

*Sun Microsystems, Inc. v. Network Appliance, Inc.*, "Sun Microsystems Inc.'s Opening Claim Construction Brief Concerning the NetApp Patent Claim Terms", dated Sep. 15, 2008, in the United States District Court of the Northern District of California, San Francisco Division, Case No. C-307-CV-08488 EDL, 34 pages.

*Sun Microsystems, Inc. v. Network Appliance, Inc.*, "Declaration of Dr. Scott Brandt in Support of Sun Microsystems, Inc.'s Opening Claim Construction Brief Concerning the NetApp Patent Claim Terms", dated Sep. 15, 2008, in the United States District Court of the Northern District of California, San Francisco Division, Case No. C-07-05488 EDL, 7 pages.

*Sun Microsystems, Inc. v. Network Appliance, Inc.*, "NetApp Inc.'s Response to Sun Microsystems Inc.'s Opening Claim Construction Brief Concerning the NetApp Patent Claim Terms", dated Sep. 29, 2008, in the United States District Court of the Northern District of California, San Francisco Division, Case No. C-07-05488 EDL, 36 pages.

*Sun Microsystems, Inc. v. Network Appliance, Inc.*, "Sun Microsystems Inc.'s Reply Claim Construction Brief Concerning the NetApp Patent Claim Terms", dated Oct. 10, 2008, in the United States District Court of the Northern District of California, San Francisco Division, Case No. C-307-CV-05488 EDL, 24 pages.

*Sun Microsystems, Inc. v. Network Appliance, Inc.*, "Declaration of Dr. Scott Brandt in Support of Sun Microsystems, Inc.'s Reply Claim Construction Brief Concerning the NetApp Patent Claim Terms", dated Oct. 10, 2008, in the United States District Court of the Northern District of California, San Francisco Division, Case No. C07-05488 EDL, 13 pages.

*Sun Microsystems, Inc. v. Network Appliance, Inc.*, "Order Construing Claim Terms of the '987, '855, '12 and '787 Patents", dated Dec. 22, 2008, in the United States District Court of the Northern District of California, San Francisco Division, Case No. C-07-05488 EDL, 44 pages.

*Sun Microsystems, Inc. v. Network Appliance, Inc.*, "Order Construing Claim Terms of the '720 and '417 Patents", dated Dec. 23, 2008, in the United States District Court of the Northern District of California, San Francisco Division, Case No. C-07-05488 EDL, 38 pages.

*Sun Microsystems, Inc. v. Network Appliance, Inc.*, "Order Regarding Tentative Claim Construction", filed Jan. 14, 2009 in United States District Court for the Northern District of California, San Francisco Division, Case No. 3:07-CV-05488-EDL, 2 pages.

*Sun Microsystems, Inc. v. Network Appliance, Inc.*, "Expert Report of Dr. Scott Brandt Regarding Invalidity of U.S. Patent No. 6,574,591", filed Oct. 12, 2009 in United States District Court for the Northern District of California, San Francisco Division, Case No. 3:07-CV-05488-EDL, 100 pages.

*Sun Microsystems, Inc. v. Network Appliance, Inc.*, "Rebuttal Expert Report of Brian Noble Re: Invalidity of U.S. Patent Nos. 6,574,591 and 7,313,720", filed Nov. 4, 2009 in United States District Court for the Northern District of California, San Francisco Division, Case No. 3:07-CV-05488-EDL, 69 pages.

*Sun Microsystems, Inc. v. Network Appliance, Inc.*, "Opening Expert Report of Scott Brandt, Ph.D., Regarding Invalidity of U.S. Patent Nos. 6,868,417 and 7,107,385", filed Oct. 12, 2009 in United States District Court for the Northern District of California, San Francisco Division, Case No. 3:07-CV-05488-EDL, 180 pages.

*Sun Microsystems, Inc. v. Network Appliance, Inc.*, "Rebuttal Expert Report of Gregory R. Ganger Regarding Invalidity of U.S. Patent Nos. 6,868,417 and 7,107,385", filed Nov. 4, 2009 in United States District Court for the Northern District of California, San Francisco Division, Case No. 3:07-CV-05488-EDL, 253 pages.

*Sun Microsystems, Inc. v. Network Appliance, Inc.*, "Rebuttal Expert Report of Cameron K. Weiffenbach", filed Nov. 4, 2009 in United States District Court for the Northern District of California, San Francisco Division, Case No. 3:07-CV-05488-EDL, 21 pages.

*Sun Microsystems, Inc. v. Network Appliance, Inc.*, "Expert Report of Mark E. Nusbaum", filed Oct. 12, 2009 in United States District Court for the Northern District of California, San Francisco Division, Case No. 3:07-CV-05488-EDL, 97 pages.

Sun Microsystems, Inc.'s Local Rule 3-6 Invalidity Contentions for U.S. Patent No. 7,313,720, filed Feb. 17, 2009 in United States District Court for the Northern District of California, San Francisco Division, Case No. C-3:07-05488-EDL, 71 pages.

"Sun Microsystems, Inc.'s Reply Claim Construction Brief Concerning the NetApp Patent Claim Terms", filed Oct. 10, 2008 in United States District Court for the Northern District of California, San Francisco Division, Case No. 3:07-cv-05488-EDL, 24 pages.

"Sun Microsystems, Inc.'s Preliminary Invalidity Contentions and Accompanying Document Production for U.S. Patent No. 7,313,720", filed May 30, 2008 in United States District Court for the Northern District of California, San Francisco Division. Case Bi, 3:07-cv-05448-EDL, 53 pages.

"Sun Microsystems, Inc.'s Responsive Claim Construction Brief Concerning the Sun Patent Claim Terms", filed Sep. 29, 2008 in United States District Court for the Northern District of California, San Francisco Division, Case No. 3:07-cv-05488-EDL, 35 pages.

Sun Microsystems Inc.'s Reply to Network Appliance, Inc.'s Answer and Counterclaims to First Amended Complaint, filed Jan. 14, 2008 in United States District Court for the Northern District of California, San Francisco Division. Case No. 5:07-cv-05448-JW, 14 pages.

"Supplemental Answer and Counterclaims to First Amended Complaint for: (1) Patent Infringement, (2) Unfair Competition Under the Lanham Act, (3) Unfair Competition Under Cal. Bus. & Prof. Code § 17200", filed Feb. 19,2008 in United States District Court for the Northern District of California, San Francisco Division. Case No. 507-cv-05448-JW, 28 pages.

"Sun Microsystems Inc.'s Reply to Network Appliance, Inc.'s Supplemental Answer and Counterclaims to First Amended Complaint and Counterclaims for Declaratory Relief", filed Mar. 7, 2008 in United States Court for the Northern District of California, San Francisco Division. Case No. 5:07-cv-05448-JW, 19 pages.

"Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 34 pages.

*Sun Microsystems, Inc. v. Network Appliance, Inc.*, "Sun Microsystems, Inc.'s Local Rule 3-6 Invalidity Contentions for U.S. Patent 7,313,720", dated Feb. 17, 2009 in the United States District Court of the Northern District of California, San Francisco Division, Case No. 3:07-CV-05488 EDL, 71 pages.

"Third Party Requester's Comments to Patent Owner's Response to Office Action mailed on Dec. 19, 2008 in Inter-Partes Re-examination of U.S. Patent No. 7,313,720", United States Patent and Trademark Office, Reexamination Control No. 95/000,373 of Patent No. 7,313,720, filed Mar. 17, 2009, 78 pages.

"Third Party Requester's Comments to Patent Owner's Response to Office Action mailed on Dec. 19, 2008 and further to the Office Action Mailed Sep. 24, 2009 in Inter-Partes Re-examination of U.S. Patent No. 7,313,720", United States Patent and Trademark Office, Reexamination Control No. 95/000,373 of Patent No. 7,313,720, filed Sep. 29, 2009, 52 pages.

(56) References Cited

OTHER PUBLICATIONS

"Third Party Requester's Comments to Patent Owner's Response to Office Action mailed on Dec. 22, 2009 in Inter-Partes Re-examination of U.S. Patent No. 7,313,720", United States Patent and Trademark Office, Reexamination Control No. 95/000,373 of Patent No. 7,313,720, filed Mar. 24, 2010, 38 pages.

"Transmittal of Communication to Third Party Requester Inter Partes Reexamination" and "Order Granting Reexamination Request", issued by the United States Patent and Trademark Office, Reexamination Control, No. 95/000,373 of Patent No. 7,313,720, mailed Aug. 18, 2008, 16 pages.

Walker, Bruce, et al., "The LOCUS Distributed Operating System," ACM, 1983, 22 pages.

Weikum, Gerhard, et al., Towards Self-Tuning Memory Management for Data Servers, Data Engineering Journal 22, 2 1999 pp. 3-11.

West, Michael, et al. The ITC Distributed File System: Prototype and Experience, Carnegie-Mellon University, Technical Report CMU-ITC-040, Mar. 1985.

Ylonen, Tatu, et al., "Concurrent Shadow Paging: Snapshots, Read-Only Transactions, and On-The-Fly Multi-Level Incremental Dumping," 1992, 22 pages.

Ylonen et al. "Concurrent Shadow Paging: Snapshots, Read-Only Transactions, and On-The-Fly Multi-Level Incremental Dumping", Laboratory of Information Processing Science, Helsinki University of Technology, FIN-02150, Espoo, Finland, retrieved from http://citeseerx.ist.psu.edu/viewdoc/summary?doi=10.1.1.48.3421 on Oct. 7, 2008, 22 pages.

Ylonen, Tatu, et al., "Concurrent Shadow Paging: Fine-Granularity Locking with Support for Extended Lock Modes and Early Releasing of Locks" 22 pages.

Ylonen, Tatu, "Concurrent Shadow Paging: A New Direction for Database Research," Helsinki University of Technology, SF-02150 Espoo, Finland, 1992, 9 pages.

Zayas, Edward R., AFS-3 Programmer's Reference: Architectural Overview, Transarc Corporation, Pittsburgh, PA, 1.0 edition 1991.

\* cited by examiner

TECHNIQUE FOR INCREASING THE NUMBER OF PERSISTENT CONSISTENCY POINT IMAGES IN A FILE SYSTEM

CROSS-REFERENCE TO RELATED APPLICATION

The present application is a continuation of U.S. patent application Ser. No. 11/333,145, which was filed on Jan. 17, 2006, and was issued on Feb. 21, 2012 as U.S. Pat. No. 8,122,286, which is a continuation of commonly assigned U.S. patent application Ser. No. 10/777,979, which was filed on Feb. 12, 2004, and was issued on Dec. 25, 2007 as U.S. Pat. No.7,313,720.

FIELD OF THE INVENTION

The present invention relates to file systems and, more specifically, to a technique for increasing the number of persistent consistency point images of a file system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in A *Case for Redundant Arrays of Inexpensive Disks (RAID)*, by D. A. Patterson, G. A. Gibson and R. H. Katz, Proceedings of the International Conference on Management of Data (SIGMOD), Jun. 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. Each block in the vbn space and in the dbn space is typically fixed, e.g., 4 k bytes (KB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a sector (or similar granularity) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The file system, such as the write-anywhere file system, maintains information about the geometry of the underlying physical disks (e.g., the number of blocks in each disk) in the storage system. The RAID system provides the disk geometry information to the file system for use when creating and maintaining the vbn-to-disk, dbn mappings used to perform write allocation operations. The file system maintains block allocation data structures, such as an active map, a space map, a summary map and snapmaps. These mapping data structures describe which blocks are currently in use and which are available for use and are used by a write allocator of the file system as existing infrastructure for the logical volume.

Specifically, the snapmap denotes a bitmap file describing which blocks are used by a snapshot. The write-anywhere file system (such as the WAFL file system) has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports (maintains) multiple snapshots that are generally created on a regular schedule. Each snapshot refers to a copy of the file system that diverges from the active file system over time as the active file system is modified. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL file system, snapshots are described in *TR3002 File System Design for a NFS File Server Appliance* by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though full set forth herein.

The active map denotes a bitmap file describing which blocks are used by the active file system. As described prior, a snapshot may contain metadata describing the file system as it existed at the point in time that the image was taken. In particular, a snapshot captures the active map as it existed at the time of snapshot creation; this file is also known as the snapmap for the snapshot. Note then that a snapmap denotes a bitmap file describing which blocks are used by a snapshot. The summary map denotes a file that is an inclusive logical OR bitmap of all snapmaps. By examining the active and summary maps, the file system can determine whether a block is in use by either the active file system or any snapshot. The space map denotes a file including an array of numbers that describe the number of storage blocks used in a block allocation area. In other words, the space map is essentially a logical OR bitmap between the active and summary maps to provide a condensed version of available "free block" areas within the vbn space. Examples of snapshot and block allocation data structures, such as the active map, space map and summary map, are described in U.S. Patent Application Publication No. US2002/0083037 A1, titled Write Allocation Based on Storage System Map and Snap-shot, by Blake Lewis et al. and published on Jun. 27, 2002, and issued on Nov. 18, 2008, as U.S. Pat. No. 7,454,445 which application is hereby incorporated by reference.

FIG. 1 is a schematic block diagram of an exemplary on-disk storage structure 100 of a logical volume of a storage system. As noted, a logical volume is typically associated with a file system and comprises data blocks organized within a vbn space. Each logical volume (hereinafter "volume") has a file system information (fsinfo) block that is preferably stored at a fixed location within, e.g., a RAID group. Fsinfo block 105 is the root of the on-disk storage structure 100, illustratively at vbns 1 and 2. When loading the volume, the storage operating system accesses those vbns to acquire the fsinfo block 105.

The fsinfo block 105 includes a variety of metadata that describes the state of the file system; also included in the fsinfo block 105 is an inode for an inode file 110. All inodes of the write-anywhere file system are organized into the inode file 111. Like any other file, the inode of the inode file is the root of the buffer tree that describes the location of blocks o the file. As such, the inode of the inode file may directly reference (point to) data blocks 107 of the inode file 111 or may reference indirect blocks 106 of the inode file 111 that, in turn, reference data blocks of the inode file. In this example, the inode for the inode file 110 includes an exemplary buffer tree comprising a plurality of inode file indirect blocks 106 that, in turn, point to inode file data blocks 107. Within each data block of the inode file are inodes 112, each of which serves as the root of a file. Among the inodes of the inode file 110, there are inodes for special metadata files, such as an active map 115, a summary map 120, a space map 125, a root directory 140 and a metadata directory 145. All user files in the file system are organized under the root directory 140, while various metadata files associated with the file system are stored under the metadata directory 145.

The inode file may further include inodes that reference a plurality of snapshots 130, 135. These snapshot inodes are the root level inodes of snapshots (PCPIs) of the active file system. Each volume has special reserved inode numbers within its vbn space; a plurality of those inode numbers (e.g., 31) is reserved for PCPIs. When a PCPI is generated of the active file system, a copy of the inode for the inode file is generated (hereinafter the "snapshot root") and assigned one of the reserved PCPI inode numbers. Thus, to access a PCPI at a particular point in time, the storage operating system accesses the appropriate snapshot root of the PCPI.

A noted disadvantage of such an on-disk storage structure is a limitation on the number PCPIs (e.g., 31) that may be maintained with the file system. As a result, a system administrator (user) may be forced to modify PCPI creation and/or retention schedules to avoid exhausting the available number of maintainable PCPIs. This limitation may prove burdensome and, possibly, costly depending upon the need for additional PCPI capacity. The present invention is directed to alleviating this limitation.

SUMMARY OF THE INVENTION

The present invention overcomes the disadvantages of the prior art by providing an on-disk storage arrangement that increases the number of persistent consistency point images (PCPIs) that may be maintained for a volume of a storage system. The on-disk storage arrangement comprises a novel volume information (volinfo) block representing the root of the volume; the volinfo block is stored at predefined locations on disk and comprises various system wide configuration data. According to the invention, the volinfo block further comprises a data structure configured to provide a level of indirection that increases the number of PCPIs maintainable by a file system executing on the storage system. To that end, the data structure may be organized as an array of pointers, wherein each pointer references a data block comprising a snapshot root, thereby enabling efficient access to each PCPI maintained by the file system.

In the illustrative embodiment, the volume comprises data blocks organized within a volume block number (vbn) space maintained by the file system. The array is embodied as a vbn lookup table having a plurality of entries, wherein each entry comprises a vbn pointer configured to point to (reference) a file system information (fsinfo) block within the volume. The fsinfo block contains information that specifies a layout of the file system. Each entry of the vbn lookup table is indexed by an identifier assigned to each PCPI; notably, entry zero holds a vbn pointer to the "active" file system. Thus, one of the fsinfo blocks referenced by the vbn lookup table is associated with the active file system, while the remaining fsinfo blocks are associated with PCPIs of the active file system.

Advantageously, the novel vbn lookup table enables efficient access to information describing the active file system and, illustratively, 255 PCPIs. This feature of the invention permits an illustrative eight-fold increase in the number of PCPIs maintainable by the file system. Additional PCPIs may be maintained in the storage system by configuring the vbn lookup table to provide further levels of indirection. For example, the entries of the vbn lookup table may be configured to reference indirect fsinfo blocks that, in turn, reference "direct" fsinfo blocks. Therefore by expanding the number of levels of indirection, any number of PCPIs may be maintained with the file system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
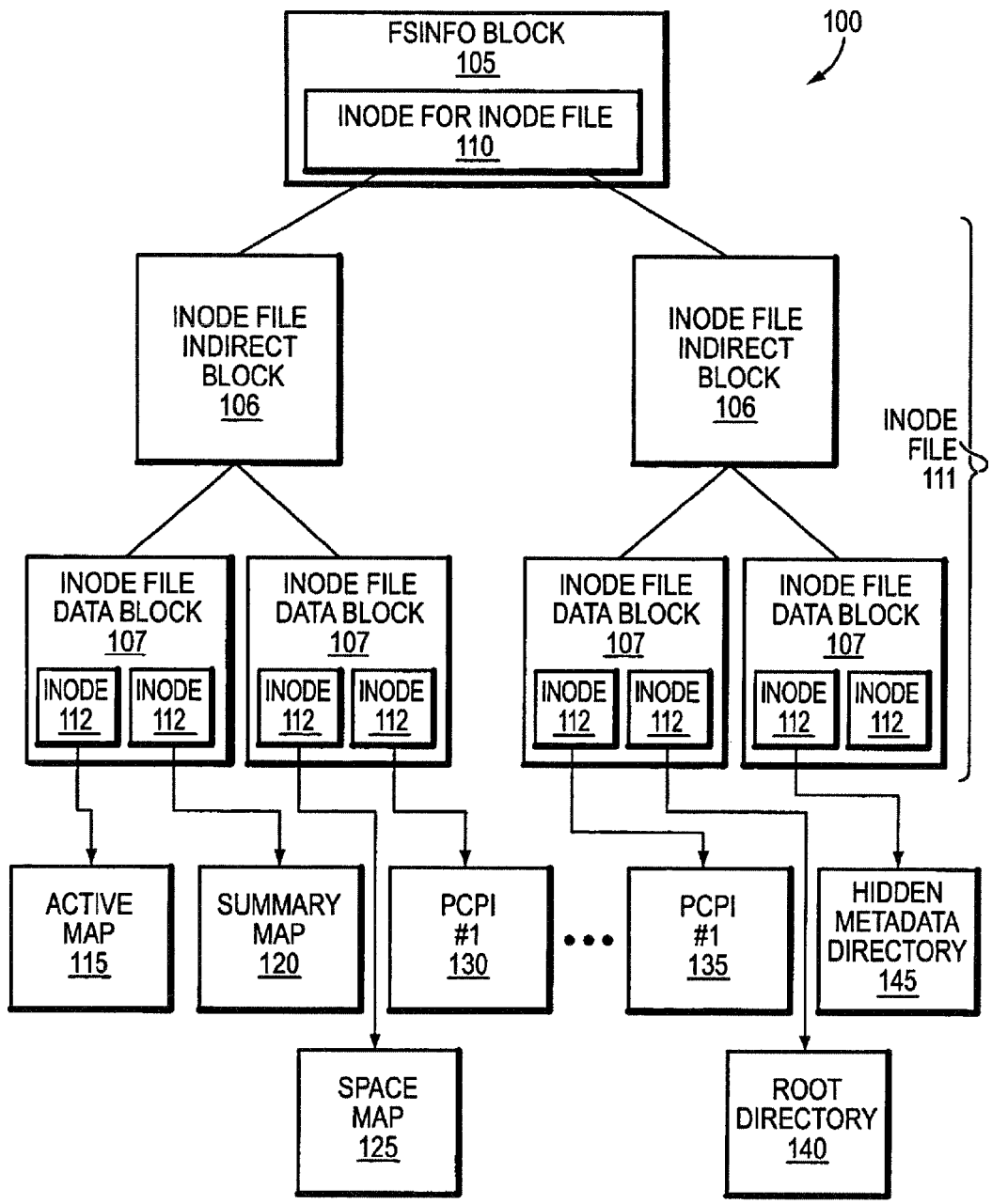
FIG. 1, already described, is a schematic block diagram of an on-disk storage structure of a volume of a storage system.
Figure 2:
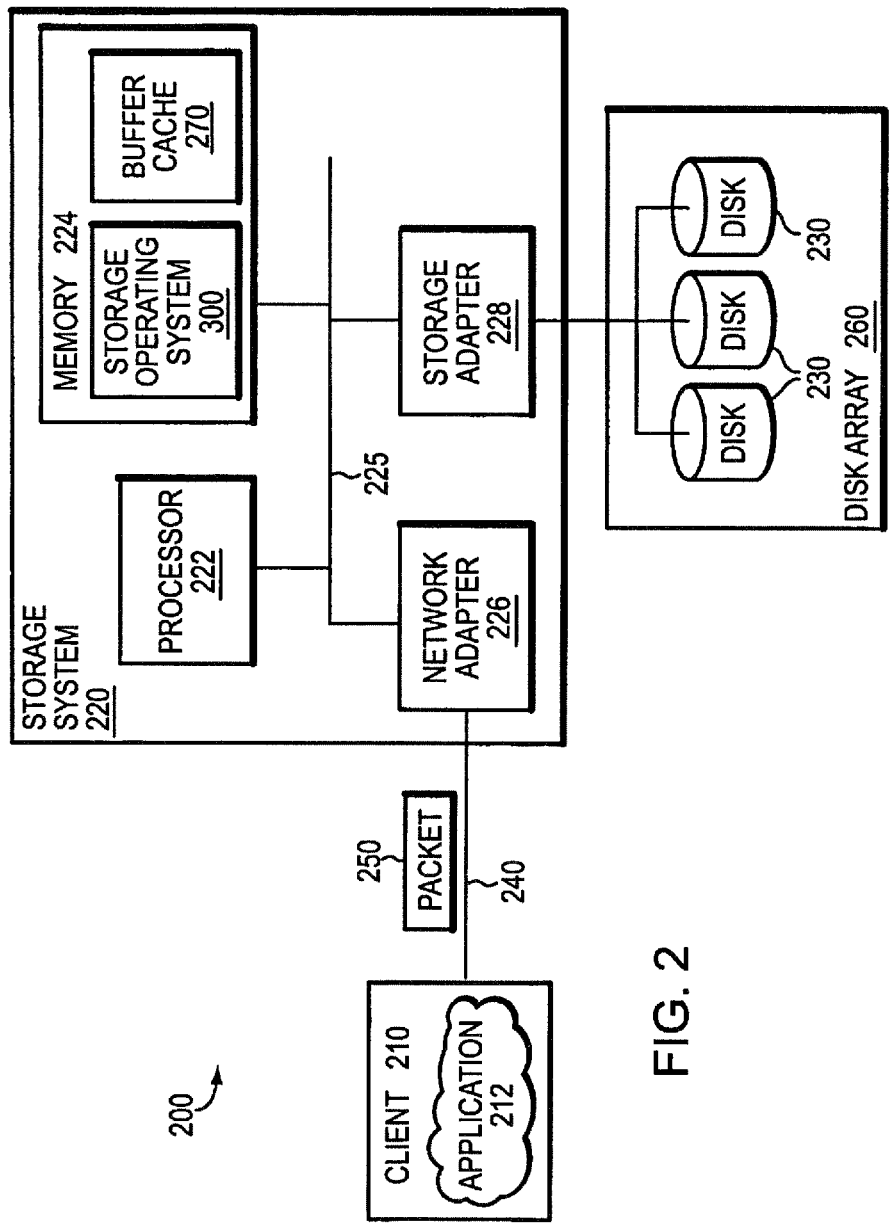
FIG. 2 is a schematic block diagram of an environment including a storage system that may be added advantageously used with a present invention.

FIG. 2 is a schematic block diagram of an environment 200 including a storage system 220 that may be advantageously used with the present invention. The storage system is a computer that provides storage service relating to the organization of information on storage devices, such as disks 230 of a disk array 260. The storage system 220 comprises a processor 222, a memory 224, a network adapter 226 and a storage adapter 228 interconnected by a system bus 225. The storage system 220 also includes a storage operating system 300 that preferably implements a high-level module, such as a file system, to logically organize the information as a hierarchical structure of directories, files and special types of files called virtual disks (hereinafter "blocks") on the disks.

In the illustrative embodiment, the memory 224 comprises storage locations that are addressable by the processor and adapters for storing software program code. A portion of the memory may be further organized as a "buffer cache" 270 for storing certain data structures associated with the present invention. The processor and adapters may, in turn, comprise processing elements and/or logic circuitry configured to execute the software code and manipulate the data structures. Storage operating system 300, portions of which are typically resident in memory and executed by the processing elements, functionally organizes the system 220 by, *inter alia*, invoking storage operations executed by the storage system. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the storage system 220 to a client 210 over a computer network 240, which may comprise a point-to-point connection or a shared medium, such as a local area network. Illustratively, the computer network 240 may be embodied as an Ethernet network or a Fibre Channel (FC) network. The client 210 may communicate with the storage system over network 240 by exchanging discrete frames or packets of data according to pre-defined protocols, such as the Transmission Control Protocol/Internet Protocol (TCP/IP).

The client 210 may be a general-purpose computer configured to execute applications 212. Moreover, the client 210 may interact with the storage system 220 in accordance with a client/server model of information delivery. That is, the client may request the services of the storage system, and the system may return the results of the services requested by the client, by exchanging packets 250 over the network 240. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 228 cooperates with the storage operating system 300 executing on the system 220 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 230, such as HDD and/or DASD, of array 260. The storage adapter includes input/output (I/O) interface circuitry that couples to the disks over an I/O interconnect arrangement, such as a conventional high-performance, FC serial link topology.

Storage of information on array 260 is preferably implemented as one or more storage "volumes" that comprise a collection of physical storage disks 230 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 230, the storage operating system 300 implements a write-anywhere file system that cooperates with virtualization modules to "virtualize" the storage space provided by disks 230. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 3:
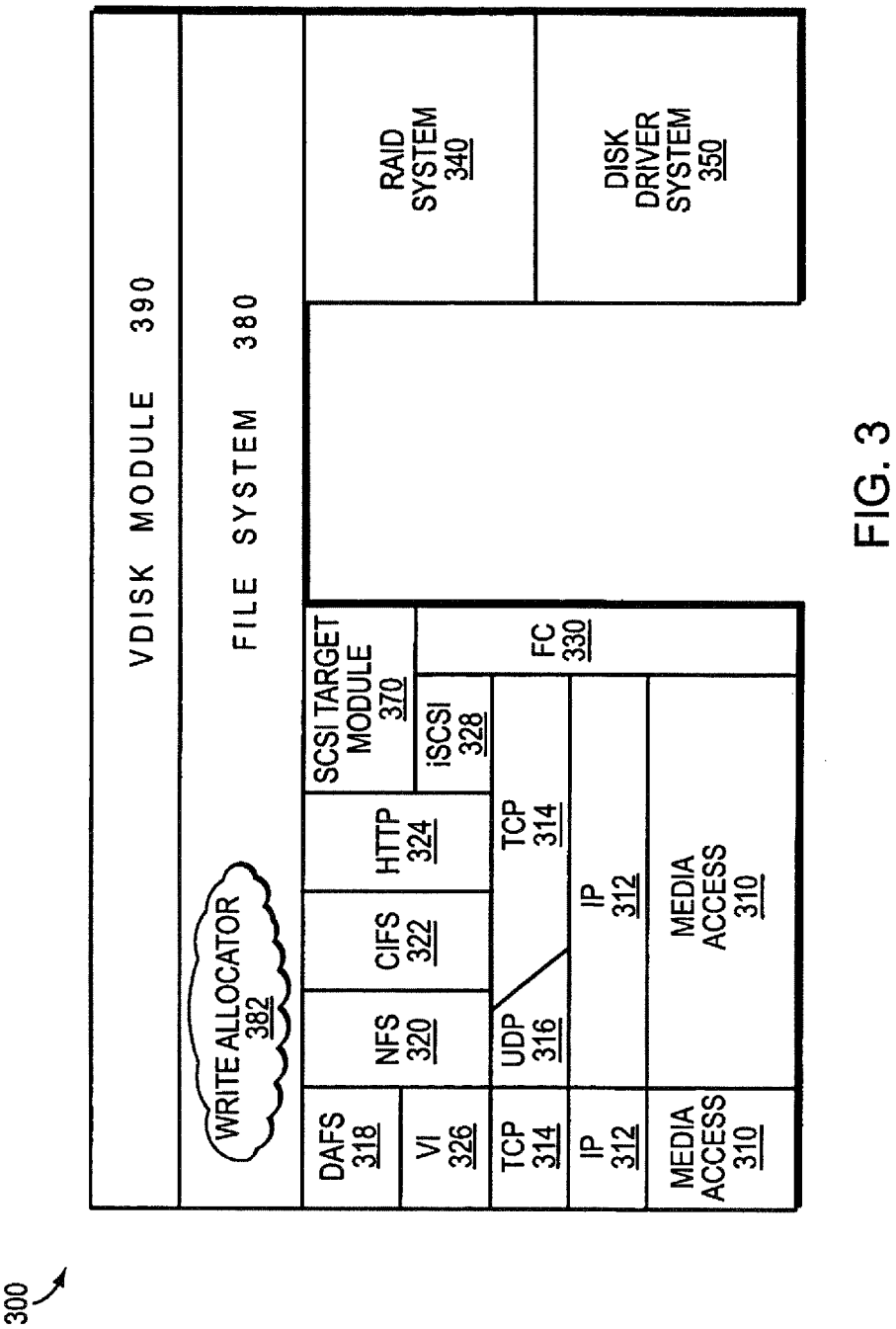
FIG. 3 is a schematic block diagram of a storage operating system that be advantageously used with a present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 340 that manages the storage and retrieval of information to and from the volumes/disks in accordance with I/O operations, and a disk driver system 350 that implements a disk access protocol such as, e.g., the SCSI protocol.

Bridging the disk software layers with the integrated network protocol stack layers is a virtualization system that is implemented by a file system 380 interacting with virtualization modules illustratively embodied as, e.g., vdisk module 390 and SCSI target is module 370. The vdisk module 390 is layered on the file system 380 to enable access by administrative interfaces. The SCSI target module 370 is disposed between the FC and iSCSI drivers 328, 330 and the file system 380 to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system 380 provides functions normally associated with a volume manager. These functions include (i) aggregation of the disks, (ii) aggregation of storage bandwidth of the disks, and (iii) reliability guarantees, such as mirroring and/or parity (RAID). The file system 380 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. Each logical volume (hereinafter "volume") has a file system information (fsinfo) block specifies the layout of data in the file system and includes the inode of the "inode file," the file contains all other inodes of the file system. The inode of the inode file may directly reference (point to) blocks of the inode file or may reference indirect blocks of the inode file that, in turn, reference direct blocks of the inode file. Within each direct block of the inode file are inodes, each of which serves as the root of a buffer tree of a file.

Operationally, a request from the client 210 is forwarded as a packet 250 over the computer network 240 and onto the storage system 220 where it is received at the network adapter 226. A network driver (of layer 310 or layer 330) processes the packet and, if appropriate, passes it on to a network protocol and file access layer for additional processing prior to forwarding to the write-anywhere file system 380. Here, the file system generates operations to load (retrieve) the requested data from disk 230 if it is not resident "in core", i.e., in the buffer cache 270. If the information is not in the cache, the file system 380 indexes into the inode file using the inode number to access an appropriate entry and retrieve a logical vbn. The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk 230 and loads the requested data block(s) in buffer cache 270 for processing by the storage system. Upon completion of the request, the storage system (and operating system) returns a reply to the client 210 over the network 240.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 220 in response to a request issued by client 210. Moreover, in another alternate embodiment of the invention, the processing elements of adapters 226, 228 may be configured to offload some or all of the packet processing and storage access operations, respectively, from processor 222, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 220. An example of a multi-protocol storage appliance that may be advantageously used with the present invention is described in U.S. patent application Ser. No. 10/215,917, issued on Jan. 18, 2011, as U.S. Pat. No. 7,873,700, titled, Multi-Protocol Storage Appliance that Provides Integrated Support for File and Block Access Protocols, by Brian Pawlowski, et al. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
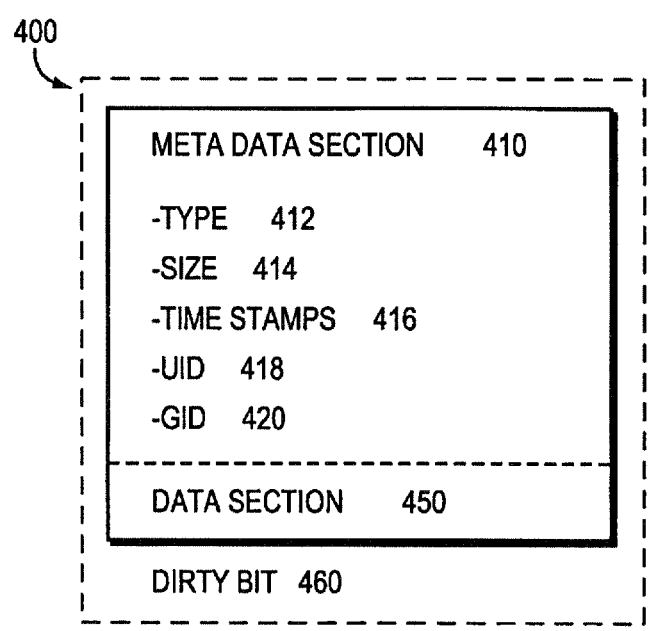
FIG. 4 is a schematic block diagram of an inode that may be advantageously used with the present.

In the illustrative embodiment, a file is represented in the write-anywhere file system by an inode data structure adapted for storage on the disks 230. FIG. 4 is a schematic block diagram of an inode 400, which preferably includes a metadata section 410 and a data section 450. The information stored in the metadata section 410 of each inode 400 describes the file and, as such, includes the type (e.g., regular, directory, virtual disk) 412 of file, the size 414 of the file, time stamps (e.g., access and/or modification) 416 for the file and ownership, i.e., user identifier (UID 418) and group ID (GID 420), of the file.

The data section 450 of an on-disk inode may contain file data or pointers, the latter referencing 4 KB data blocks on disk used to store the file data. Each pointer is preferably a logical vbn to facilitate efficiency among the file system and the RAID system 340 when accessing the data on disks. Given the restricted size (e.g., 128 bytes) of the inode, file data having a size that is less than or equal to 64 bytes is represented, in its entirety, within the data section of that inode. However, if the file data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 450 of the inode (e.g., a second level inode) references an indirect block (e.g., a first level block) that contains 1024 pointers, each of which references a 4 KB data block on disk. For file data having a size greater than 64 MB, each pointer in the data section 450 of the inode (e.g., a third level inode) references a double-indirect block (e.g., a second level block) that contains 1024 pointers, each referencing an indirect (e.g., a first level) block. The indirect block, in turn, contains 1024 pointers, each of which references a 4 KB data block on disk. When accessing a file, each block of the file may be loaded from disk 230 into the buffer cache 270.

The contents of the file data residing in the level zero data blocks of the file will be interpreted differently depending on the type of file (inode) defined within the type field 412. For example, the data blocks of a directory inode contains metadata that adhere to a structure defined by the file system to describe a directory, whereas the data blocks of a regular inode may simply contain the data associated with the file.

When an on-disk inode (or block) is loaded from disk 230 into buffer cache 270, its corresponding in core structure embeds the on-disk structure. For example, the dotted line surrounding the inode 400 (FIG. 4) indicates the in core representation of the on-disk inode structure. The in core structure is a block of memory that stores the on-disk structure plus additional information needed to manage data in the memory (but not on disk). The additional information may include, e.g., a "dirty" bit 460. After data in the inode (or block) is updated/modified as instructed by, e.g., a write operation, the modified data is marked "dirty" using the dirty bit 460 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled Method for Maintaining Consistent States of a File System and for Creating User-Accessible Read-Only Copies of a File System by David Hitz et al., issued on Oct. 6, 1998.

C. Increasing the Number of PCPIs in a File System

The present invention is directed to an on-disk storage arrangement that increases the number of persistent consistency point images (PCPIs) that may be maintained by file system 380 for a volume of storage system 220. The storage arrangement comprises a novel volume information (volinfo) block representing a root of the volume; the volinfo block is stored at predefined locations on disk 230 and comprises various system wide configuration data. In particular, the volinfo block contains appropriate fields so that software, including versions of the storage operating system, may recognize that the volinfo block is not a fsinfo block. As noted above, the fsinfo block is typically located at vbns 1 and 2; as described herein, the on-disk storage arrangement of the present invention replaces the fsinfo block with the novel volinfo block at this predefined location.

Figure 5:
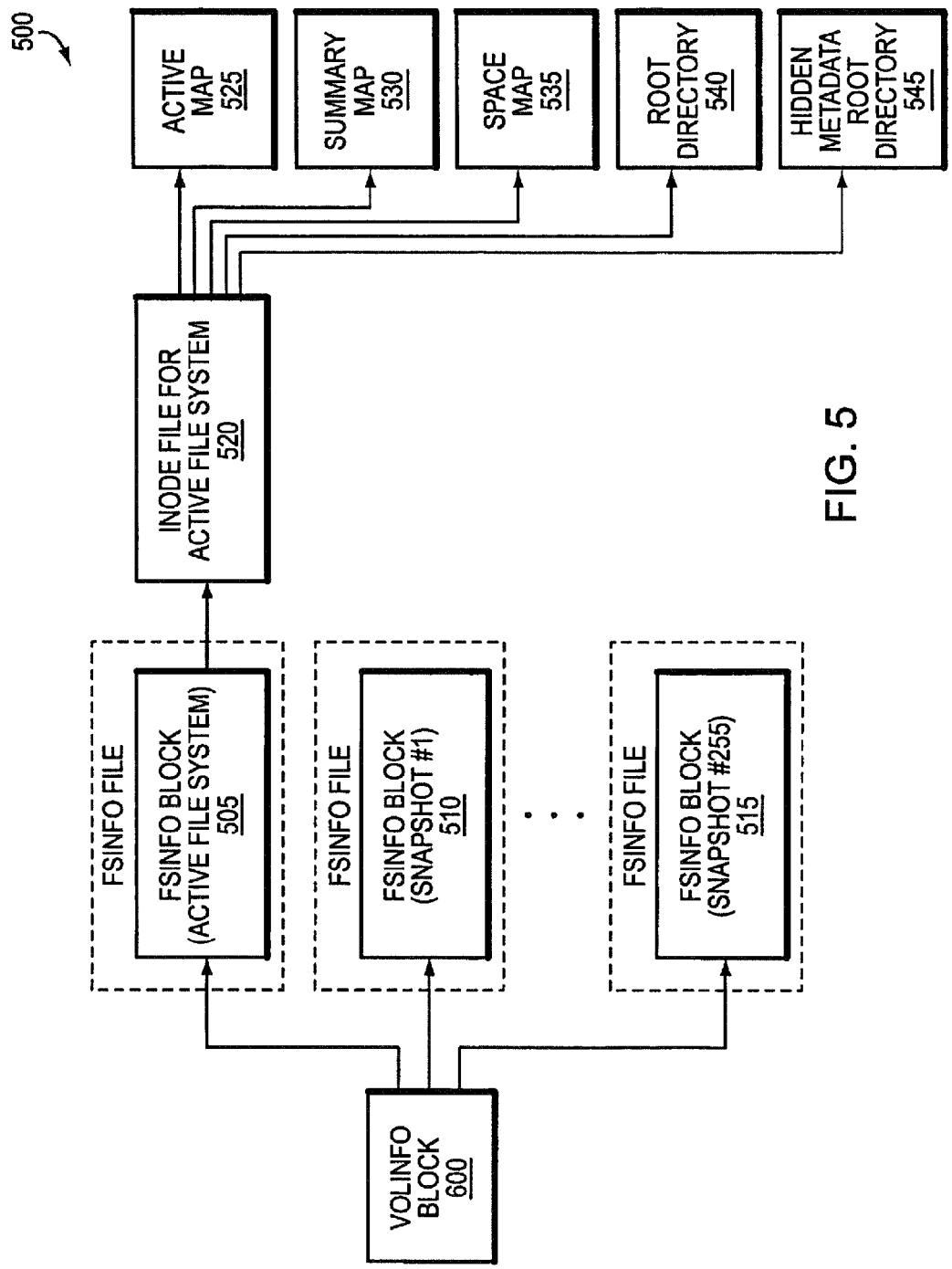
FIG. 5 is a schematic block diagram of an on-disk storage arrangement of a volume in accordance with an illustrative embodiment of the present invention.

FIG. 5 is a schematic block diagram of an exemplary on-disk storage arrangement 500 of a file system according to an illustrative embodiment of the present invention. The on-disk storage arrangement 500 comprises a volinfo block 600 that contains pointers to various fsinfo blocks including fsinfo block 505 representing the active files system, as well as fsinfo blocks 510 and 515 representing various PCPIs associated with the active file system. The volinfo 600 is illustratively located at vbns 1 and 2 or, in alternate embodiments, at another predetermined location on disk.

Each fsinfo block 505, 510, 515 is illustratively contained within an fsinfo file, the contents of which comprise the fsinfo block. In this example, the fsinfo block 505 for the active file system includes the inodes of the inode file for the active file system 520. The inode file for the active file system 520 includes further inodes for an active map 525, a summary map 530, a space map 535, a root directory 540 and a hidden metadata directory 545. Each additional fsinfo block, for example, fsinfo blocks 510 and 515, that is associated with a PCPI includes the inode of the inode file for the PCPI, which in turn includes appropriate inodes for active maps and the like (not shown) for the specific PCPI.

Figure 6:
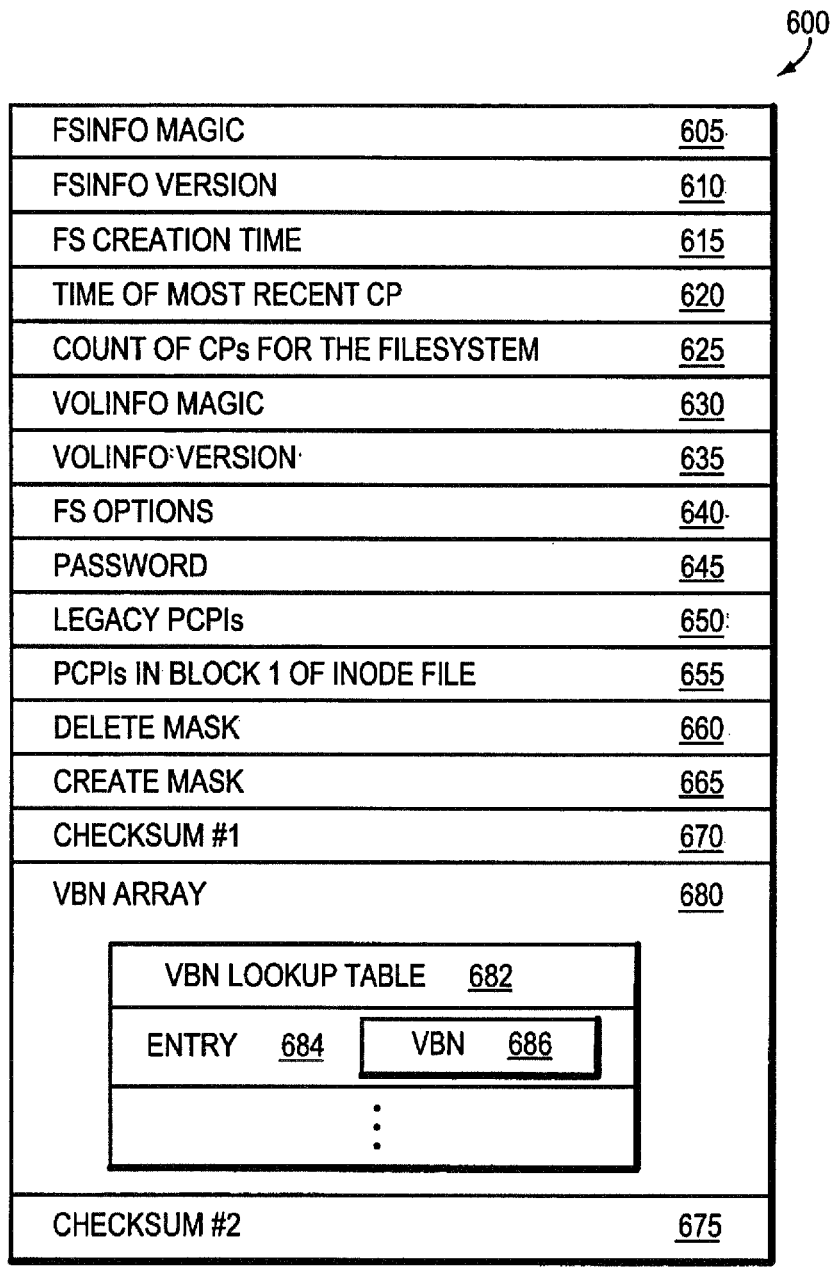
FIG. 6 is a schematic block diagram of an exemplary volume information block in accordance with the embodiment with the present information.

FIG. 6 is a schematic block of an exemplary volinfo block 600 in accordance with an embodiment of the present invention. The volinfo block 600 includes an fsinfo magic field 605, an fsinfo version field 610, a file system creation time field 615, a time of most recent CP 620 and a count of a number of CPs for file system field 625. The block 600 also includes a volinfo magic field 630, a volinfo version 635, a file system options field 640, a password field 645, a legacy PCPIs field 650 and a list of PCPIs stored in block one of inode file field 655. In addition, the volinfo block includes a delete mask field 660, a create mask field 665, a first checksum field 670, an vbn array field 680 and a second checksum field 675. It should be noted that in alternate embodiments additional and/or differing fields may be included in the volinfo block 600.

The fsinfo magic field 605 stores an appropriate magic value for backward compatibility with earlier fsinfo block. Similarly, the fsinfo version field 610 is needed for backwards compatibility, and is tagged with a version number that indicates that the block is a volinfo block, not an fsinfo block. The fsinfo creation time field 615 stores a value indicating the time that the file system was created. Field 620 identifies the time when a most recent consistency point (CP) was generated and field 625 stores a count of the number of CPs performed on the file system. The volinfo magic field 630 stores a magic number identifying the data structure 600 as a volinfo block, and the volinfo version field 635 stores the version of the volinfo block. Note that the fsinfo block retains a version field, which continues to be the version that is updated to reflect any on-disk format change that is made to the file system. However, should a major change to the volinfo data structure occur, the volinfo version field 635 would be updated as well. The file system options field 640 includes a set of options for the file system and the password field 645 stores a password associated with the file system. The password may be utilized to limit certain administrative operations.

The legacy PCPI field 650 identifies those PCPIs that were created with an older on-disk format which lacked certain important metadata files (e.g., the fsinfo file). The content of field 655 identifies those PCPIs whose snapshot roots are stored in block 1 of the inode file, i.e., PCPIs that were created on a file system prior to the present invention. The delete mask field 660 and create mask field 665 identify PCPIs that are currently being deleted or created. The first checksum field 670 stores a checksum calculated on the contents of fields 605-665, whereas the second checksum field 675 stores a checksum calculated for the entire volinfo block 600.

According to the invention, the volinfo block 600 comprises a data structure configured to provide a level of indirection that increases the number of PCPIs maintainable by file system 380. To that end, the data structure may be organized as an array of pointers, wherein each pointer references a block containing a snapshot root (i.e., inode for the inode file of a PCPI), thereby enabling efficient access to each PCPI maintained by the file system. The array of pointers is contained in the vbn array field 680.

In the illustrative embodiment, the array is preferably embodied as a vbn lookup table 682 having a plurality of entries 684, wherein each entry comprises a vbn pointer 686 configured to point to (reference) a fsinfo block within the volume. As noted, the fsinfo block contains information that specifies the layout of the file system. Each entry 684 of the vbn lookup table 682 is indexed by an identifier (ID) assigned to each PCPI; notably, entry zero holds a vbn pointer 686 to the "active" file system. Thus, one of the fsinfo blocks referenced by the vbn lookup table 682 is associated with the active file system, while the remaining fsinfo blocks are associated with PCPIs of the active file system.

Advantageously, the novel vbn lookup table 682 in vbn array field 680 enables efficient access to information describing the active file system and, illustratively, 255 PCPIs. This feature of the invention permits an illustrative eight-fold increase in the number of PCPIs maintainable by the file system. Additional PCPIs may be maintainable in the storage system by configuring the vbn lookup table 682 to provide further levels of indirection. For example, the entries of the vbn lookup table may be configured to reference indirect fsinfo blocks that, in turn, reference "direct" fsinfo blocks. Therefore by expanding the number of levels of indirection, any number of PCPIs may be maintained with the file system. It should be noted that in embodiments utilizing indirect blocks, all per-PCPI state fields, e.g., delete mask 660 and create mask 665, would be located in the appropriate indirect blocks and not in the volinfo block.

Figure 7:
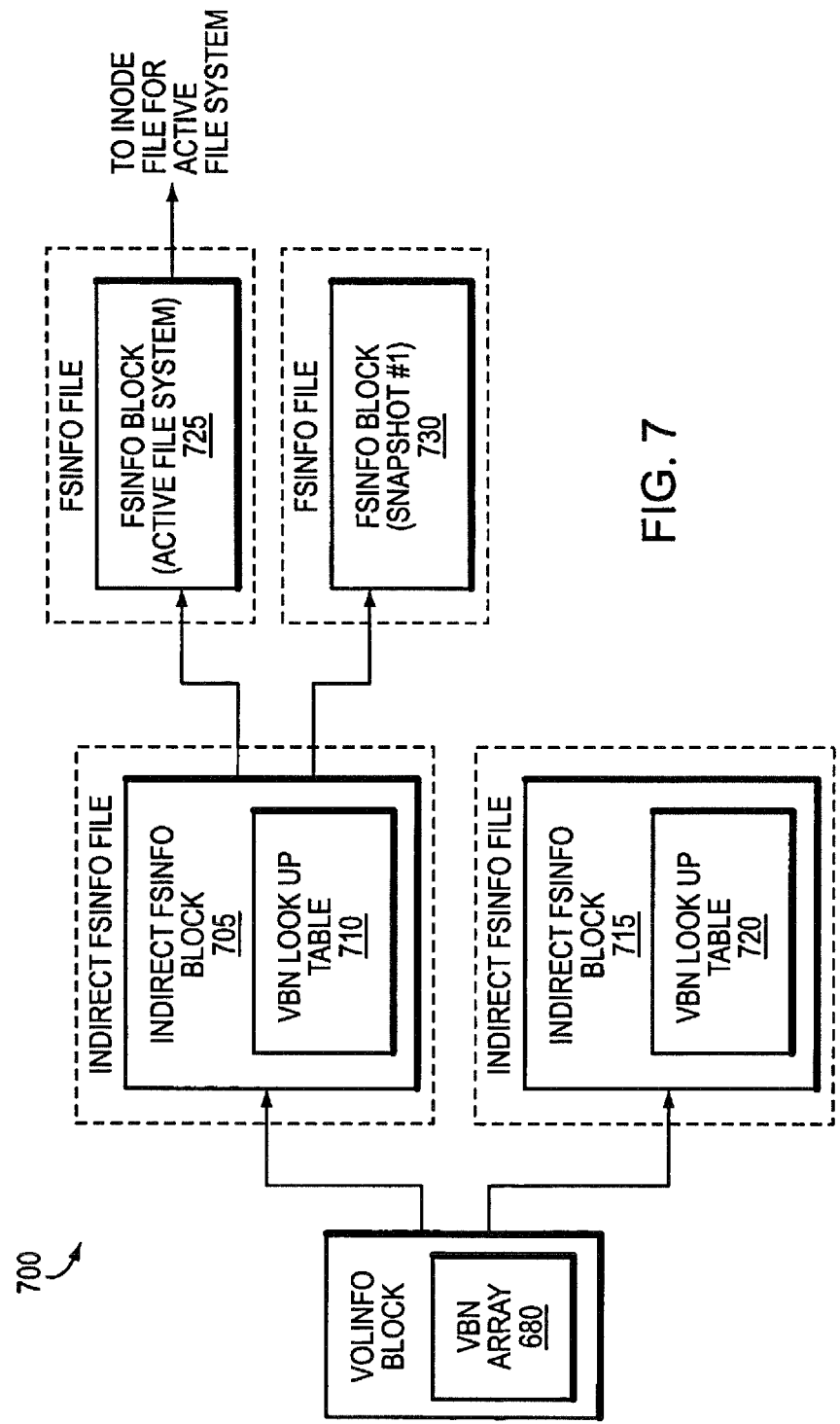
FIG. 7 is a schematic block diagram of an on-disk storage arrangement of a volume in accordance with an alternate embodiment of the present invention.

FIG. 7 is a schematic block diagram of such an on-disk storage arrangement 700 in accordance with an alternate embodiment of the present invention. The on-disk storage arrangement 700 has a volinfo block 600 representing a root of a volume and including pointers to indirect fsinfo block 705 and 715. Note that the pointers are illustratively vbns and are organized as an array in vbn array field 680. Each indirect fsinfo block 705, 715 includes a vbn lookup table 710, 720 (similar to vbn lookup table 682) that maps PCPI IDs to appropriate fsinfo blocks. For example, entry 0 of the vbn lookup table 710 is indexed by PCPI ID 0 and the resulting vbn references fsinfo block 725 for the active file system. Similarly, entry 1 of the vbn lookup table 710 is indexed by PCPI ID 1 and the resulting vbn references fsinfo block 730 associated with PCPI 1.

To again summarize, the present invention is directed to an on-disk storage arrangement that increases the number of persistent consistency point images (PCPIs) that may be maintained for a volume of a storage system. The novel volume information (volinfo) block represents a root of the volume and comprises various system wide configuration data. The volinfo block further comprises a data structure configured to provide a level of indirection that increases the number of PCPIs maintainable by a file system executing on the storage system. To that end, the data structure may be organized as an array of pointers, wherein each pointer references a block containing a snapshot root, thereby enabling efficient access to each PCPI maintained by the file system.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system adapted to maintain an increased number of persistent consistency point images (PCPI), the system comprising:
    a processor executing a storage operating system;
    at least one storage device adapted to store a volume information (volinfo) block, the volinfo block being a root of a tree of blocks, the volinfo block further comprising metadata describing a plurality of file systems, the volinfo block further comprising a volinfo version field identifying a version of an on-disk volinfo block format and a fsinfo version field identifying a version of an on-disk fsinfo block format, wherein the storage operating system is configured to read an fsinfo version value stored in the fsinfo version field to determine whether an on-disk format change has occurred to the plurality of file systems and further configured to read a volinfo version value stored in the volinfo version field to determine whether a change has occurred to the on-disk volinfo block format;
    wherein the tree of blocks comprises a plurality of direct file system information (fsinfo) block, each of the fsinfo blocks being associated with one of the plurality of file systems.

2. The system of claim 1 wherein the tree of blocks further comprises a plurality of indirect fsinfo blocks.

3. The system of claim 2 wherein each indirect fsinfo block points to one or more of the plurality of direct fsinfo blocks.

4. The system of claim 3 wherein each indirect fsinfo block comprises an array of pointers.

5. The system of claim 4 wherein each entry in the array of pointers comprises a volume block number.

6. The system of claim 4 wherein the volinfo block comprises an array of pointers to the plurality of indirect fsinfo blocks.

7. The system of claim 6 wherein each entry of the array of pointers comprises a volume block number.

8. The system of claim 1 wherein a first direct fsinfo block of the plurality of direct fsinfo blocks is associated with an active file system.

9. The system of claim 1 wherein the volinfo block comprises a plurality of pointers that reference the plurality of direct fsinfo blocks.

10. The system of claim 9 wherein the pointers comprise volume block numbers.

11. The system of claim 1 wherein the plurality of file systems comprises of an active file system and one or more persistent consistency point images (PCPIs).

12. The system of claim 11 wherein each PCPI is read only and space conservative.

13. A method for maintaining an increased number of persistent consistency point images (PCPIs) maintained for a volume of a storage system, the method comprising:
    providing a file system information (fsinfo) block associated with an active file system executing on the storage system;
    providing one or more PCPI fsinfo blocks, each PCPI fsinfo block associated with a PCPI;
    providing a volume information (volinfo) block at a predetermined location within storage space associated with the storage system, the volinfo block comprising a plurality of pointers configured to reference the fsinfo and PCPI fsinfo blocks through one or more indirect fsinfo blocks, the volinfo block further comprising a volinfo version field identifying an on-disk version of a volinfo block format and a fsinfo version field identifying a version of an on-disk fsinfo block format;
    determining, by reading a volinfo version value stored in the volinfo version field, whether whether a change has occurred to the on-disk volinfo block format; and
    determining, by reading a fsinfo version value stored in the fsinfo version field, whether an on-disk format change has occurred to the plurality of file systems.

14. The method of claim 13 wherein the plurality of pointers are indexed by an identifier and a predetermined identifier is associated with the fsinfo block associated with the active file system.

15. The method of claim 13 wherein each of the plurality of pointers comprises a volume block number.

16. The method of claim 13 further comprising providing a second volinfo block at a second predetermined location within the storage space associated with the storage system.

17. The method of claim 13 wherein each PCPI is read only and space conservative.

18. The method of claim 13 wherein each indirect fsinfo block comprises a plurality of pointers that reference one of the fsinfo and PCPI fsinfo blocks.

19. The method of claim 18 wherein the plurality of pointers that reference one of the fsinfo and PCPI fsinfo blocks are organized in an array within each indirect fsinfo block.

20. A non-transitory readable medium, having program instructions executing on a processor, the non-transitory computer readable medium comprising:
   program instructions that provide a file system information (fsinfo) block associated with an active file system executing on a storage system;
   program instructions that provide one or more persistent consistency point images (PSPI) fsinfo blocks, each PCPI fsinfo black associated with a PCPI;
   program instructions that provide a first volume information (volinfo) block stored at a first predetermined location within storage space associated with the storage system and a second volinfo block stored at a second predetermined location within the storage space, the first and second volinfo blocks comprising a plurality of pointers configured to reference the fsinfo and PCPI fsinfo blocks through one or more indirect fsinfo blocks, each of the first and second the volinfo blocks further comprising a volinfo version field identifying a version of an on-disk volinfo block format and a fsinfo version field identifying a version of an on-disk fsinfo block format;
   program instructions that determine, by reading a volinfo version value stored in the volinfo version field, whether whether a change has occurred to the on-disk volinfo block format; and
   program instructions that determine, by reading a fsinfo version value stored in the fsinfo version field, whether an on-disk format change has occurred to the plurality of file systems.

* * * * *

UNITED STATES PATENT AND TRADEMARK OFFICE
CERTIFICATE OF CORRECTION

| | | |
|---|---|---|
| PATENT NO. | : 9,009,168 B2 | Page 1 of 1 |
| APPLICATION NO. | : 13/401469 | |
| DATED | : April 14, 2015 | |
| INVENTOR(S) | : Emily Eng et al. | |

It is certified that error appears in the above-identified patent and that said Letters Patent is hereby corrected as shown below:

In the Specification:
Col. 3, line 47 should read:
used interchangeably throughout this patent without deroga- Col. 4, line 32 should read:
age System Map and Snapshot, by Blake Lewis et al. and Col. 8, line 44 should read:
390 and SCSI target module 370. The vdisk module 390 is In the Claims:
Claim 20, Col. 16, line 11 should read:
version value stored in the volinfo version field, Signed and Sealed this
Sixth Day of October, 2015

Michelle K. Lee
*Director of the United States Patent and Trademark Office*